Jan. 12, 1943.   C. T. PFLUEGER   2,307,747
DEVICE FOR COVERING AND LOCKING NUTS
Filed March 28, 1940
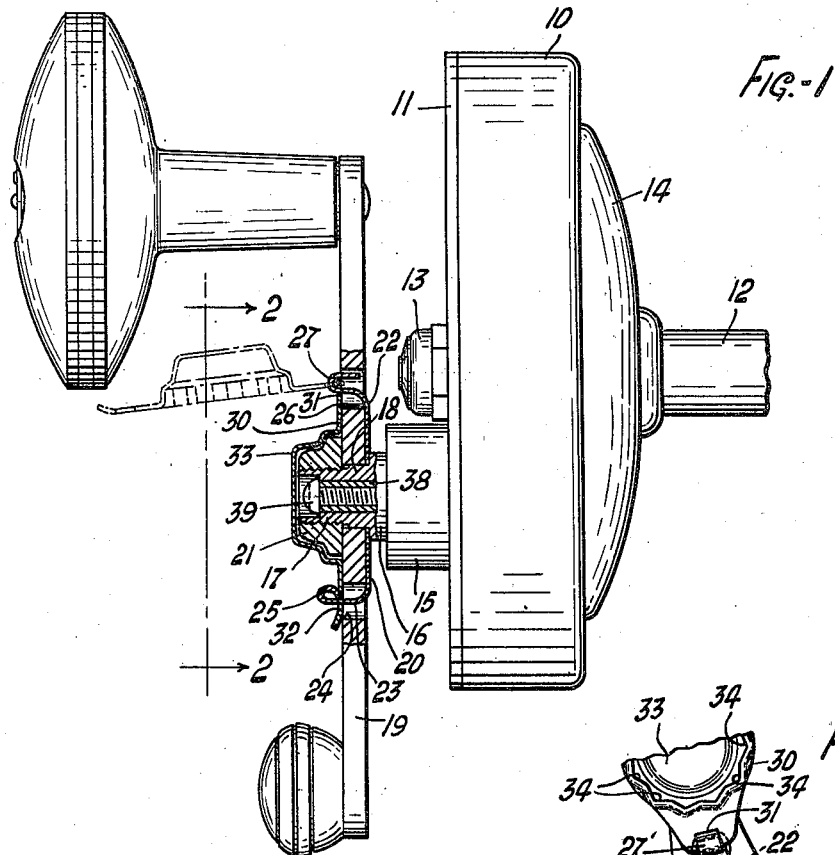
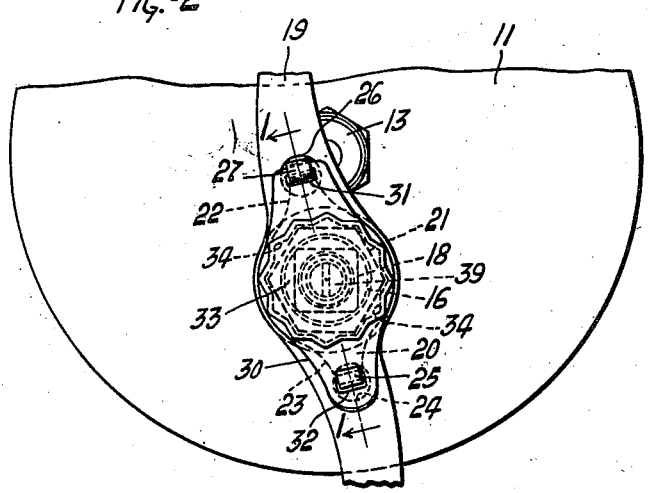
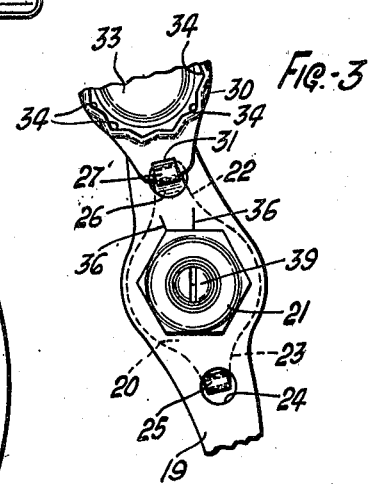
INVENTOR
CHARLES T. PFLUEGER
BY Ely & Frye
ATTORNEYS Patented Jan. 12, 1943

2,307,747

UNITED STATES PATENT OFFICE 2,307,747

DEVICE FOR COVERING AND LOCKING NUTS

Charles T. Pflueger, Akron, Ohio, assignor to The Enterprise Manufacturing Company, Akron, Ohio, a corporation of Ohio Application March 28, 1940, Serial No. 326,430

4 Claims. (Cl. 287—53)

This invention relates to devices for covering and locking nuts, and is especially applicable to the covering of nuts that are mounted upon the ends of shafts that are formed with axial bores for the reception of lubricating fluid.

The invention is of primary utility in its application to fishing reels wherein the crank of the reel is secured, by means of a nut, to the stem or hub of a gear, and said stem is formed with an axially disposed oil hole. It is desirable that the latter be suitably covered to exclude dirt therefrom, and also to keep oil from leaking out. It is also desirable that the crank-nut be capable of being locked, after being set up, to prevent possible unthreading and loss of the nut.

The chief objects of this invention are to provide in an improved manner for the locking of the crank-nut of a fishing reel and the covering of the end of the threaded member upon which the nut is mounted. Further objects include the provision of a cap or lid capable of performing both the aforementioned functions; to provide a cap or lid of the character mentioned that may be hingedly mounted upon the crank of a fishing reel; and to provide a combination hinge and lock member for said cap or lid, which member is of simple construction and readily mounted upon a fishing reel. Other objects will be manifest as the description proceeds.

Of the accompanying drawing:

Figure 1 is a fragmentary side elevation of a fishing reel, and the improved cap and lock device operatively associated therewith, parts being sectioned on the line 1—1 of Fig. 2;

Figure 2 is an end elevation of the structure shown in Fig. 1 as viewed from the line 2—2 thereof; and Figure 3 is a view similar to Fig. 2 with the cap and lock device in uncapped position to disclose the structure normally covered thereby.

Referring to Fig. 1 of the drawing there is shown one end portion of a fishing reel of which 10 is a gear case, 11 is an end plate on said gear case, 12 is a spool shaft that extends through the gear case and is journaled in a bearing structure 13 carried by the end plate 11, and 14 is the usual flange on one end of the shaft 12. It will be understood that the gear case 10 contins the gears (not shown) by means of which the shaft 12 is rotated, said gears being manually rotatable. To this end the end plate 11 of the reel is formed with an outwardly extending tubular boss 15 that is located off-center with relation to the axis of the reel, said boss comprising a bearing (not shown) for a hollow or sleeve-like axial shaft or stem 16 of the main driving gear within said gear case.

The stem 16 is rotatable upon the usual center-post 38 and is held in position by the screw 39, the axis of which may have a small passage indicated on the drawing through which oil may pass to the gearing within the casing.

The hollow gear shaft stem 16 is formed with a threaded terminal portion 17, and a square portion 18 immediately rearwardly of the latter, the square portion 18 being smaller than the main body of the stem to provide a shoulder or abutment at its juncture therewith. Mounted upon said square portion is the usual operating crank 19, and a hinge-and-latch plate 20, said crank and plate being formed with respective square apertures in which said square portion 18 is received, the plate being positioned flush against the rear face of the crank and in abutting relation to the shoulder at the rear end of said square portion. The crank and plate are retained in place upon the hollow stem 16 by a hexagonal nut 21 mounted upon the threaded terminal portion 17 of said stem. When the nut 21 is removed and the crank lifted from its seat, the cap and the plate 20 can be removed from the crank by simple manipulation. The assembly of the parts is likewise performed easily and quickly. The plate 20, which is formed of spring metal or similar material, is formed at diametrically opposite regions with radial extensions 22, 23 respectively, the latter being bent at right angles and extended through an aperture 24 in the crank 19, and having its terminal portion looped back upon itself to constitute a latch formation 25, which latch formation is located at the front side of crank 19. The extension 22 of plate 20 has its terminal portion reversely curved and extended forwardly into an aperture 26 in the crank 19, a portion extending beyond the front face of the crank in the form of a loop 27 that constitutes a hinge member, as presently will be explained.

For covering and locking the nut 21, a metal cap 30 is provided, which cap is formed at one end with a slot 31 in which the loop 27 is received, the cap thereby being hingedly retained on said loop. The other end of the cap 30 is formed with a somewhat larger slot 32 adapted to pass over the latch formation 25 of the plate 20, the slot 32 and formation 25 normally being somewhat out of registry so that the latch is sprung as the cap passes over the same, and thereafter returns to normal position to retain the cap in place. In its medial region the cap 30 is formed with a cupshaped formation 33, the concave side of which receives the nut 21 when the cap is in the locked position shown in full lines in Fig. 1. The perimeter of the cup formation 33 is of polygonal shape such as to present a plurality of angular reentrants or recesses 34, 34 to the concavity of the cap, the number of said recesses being a multiple of the number of lateral corners or arrises of the nut 21. In the illustrated embodiment of the invention the recesses 34 are twelve in number. The arrangement is such that when the cap 30 is in the closed position shown in Figs. 1 and 2, the respective lateral corners of the nut 21 are receivable in the recesses 34 of the cap 30 with the result that the nut cannot unthread itself during use.

In order that the nut 21 will be received in the concavity of the cap 30 it is necessary that said nut be disposed substantially in determinate angular position with relation thereto. To facilitate such angular positioning of said nut, the outer face of the crank 19 has two lines 36, 36 scribed thereon, which lines are radial with relation to the axis of gear stem 16, and spaced 30° apart. When any arris or corner of the nut 30 is substantially coincident with either line 36 the nut will fit readily within the concavity of the cap 30, the latter being sufficiently larger than the nut to permit a modicum of play therebetween.

Thus the cap 30 in addition to preventing rotation of the nut 21 relatively of the threaded portion 17 of the gear stem 16, also prevents dirt from entering the end of the stem 16 and retains any lubricant that may leak from the end of the latter. The cap gives the reel a neat and finished appearance, and the hinged arrangement of the cap provides ready accessibility to the nut 21 and end of the stem 16. Furthermore the plate 20 provides a simple and economical means for hingedly mounting the cap 30 on the crank 19, and for latching said cap in place thereon.

The arrangement also reduces the height of the assembly and as the cap is smooth and rounded, it reduces the possibility of injury to the knuckles of the fisherman. In former reel constructions, the cap nut projects a considerable distance above the surface of the crank and is in position so that it is easily struck by the hand of the fisherman when winding the reel.

Modification may be resorted to without departing from the spirit of the invention or the scope thereof as defined by the appended claims. The cap may also be employed in other positions upon a reel where it is desired to lock a securing nut and cover a lubricating opening, as for example at a main reel bearing.

What is claimed is:

1. A fishing reel that comprises a shaft, a crank on the end of the shaft, a nut on the shaft to retain the crank thereon, and locking means for the nut comprising a plate removably and nonrotatably mounted on said crank, said plate having a central aperture to receive the shaft, a hinge formation at one end thereof and a latch formation at its other end, and a cap adapted to cover the end of the shaft and the nut thereon and to prevent rotation of the nut relatively of the crank, said cap being hinged to said plate and retained in position over the shaft and nut by the latch formation on said plate.

2. A protective device for a fishing reel that comprises a shaft, a crank on the end of the shaft, and a nut on the shaft to retain the crank thereon, said device comprising a plate mounted flush with the rear face of the crank and formed on opposite sides of the axis of the crank with extensions that extend through respective apertures in the crank, one of said extensions being bent in the form of a loop that constitutes a hinge, the other extension being formed as a latch, and a cap on the front of the crank hinged to said plate-loop, said cap being adapted to cover the end of the shaft and nut thereon, and to be retained in such position by the latch portion of said plate.

3. A fishing reel comprising a shaft having a shoulder, a crank resting against the shoulder and a nut on the end of the shaft to hold the crank in position, a plate between the crank and the shoulder, said plate having arms which project through the crank, and a movable cap for the nut mounted on the projecting ends of said arms.

4. A combination as set forth in claim 3 in which the cap is provided with means to engage and prevent rotation.

CHARLES T. PFLUEGER.

CERTIFICATE OF CORRECTION.

Patent No. 2,307,747.  January 12, 1943.

CHARLES T. PFLUEGER.

It is hereby certified that error appears in the printed specification of the above numbered patent requiring correction as follows: Page 2, second column, line 46, claim 4, after the word "rotation" and before the period insert --of the nut--; and that the said Letters Patent should be read with this correction therein that the same may conform to the record of the case in the Patent Office.

Signed and sealed this 16th day of February, A. D. 1943.

(Seal)

Henry Van Arsdale,
Acting Commissioner of Patents.